US009652705B1

(12) United States Patent
Lindblad et al.

(10) Patent No.: US 9,652,705 B1
(45) Date of Patent: May 16, 2017

(54) RFID TAG ON FLEXIBLE SUBSTRATE ARRANGEMENT

(75) Inventors: Scott Lindblad, Lakeville, MN (US); David Neuman, Randolph, MN (US)

(73) Assignee: Automated Assembly Corporation, Lakeville, MN (US)

(*) Notice: Subject to any disclaimer, the term of this patent is extended or adjusted under 35 U.S.C. 154(b) by 834 days.

(21) Appl. No.: 13/400,794

(22) Filed: Feb. 21, 2012

(51) Int. Cl.
| G06K 19/00 | (2006.01) |
| G06K 19/067 | (2006.01) |
| H01P 11/00 | (2006.01) |
| G06K 19/02 | (2006.01) |

(52) U.S. Cl.
CPC ........ G06K 19/067 (2013.01); G06K 19/02 (2013.01); H01P 11/00 (2013.01)

(58) Field of Classification Search
USPC ..... 235/492; 340/572.7; 29/600, 601, 592.1, 29/843; 257/414
See application file for complete search history.

(56) References Cited

U.S. PATENT DOCUMENTS

| 6,088,230 | A | 7/2000 | Finn et al. |
| 6,606,247 | B2 | 8/2003 | Credelle et al. |
| 6,810,580 | B2 | 11/2004 | Yamaguchi et al. |
| 6,940,408 | B2 | 9/2005 | Ferguson et al. |
| 7,417,550 | B2 | 8/2008 | Brown et al. |
| 7,559,131 | B2* | 7/2009 | Credelle et al. ............. 29/600 |
| 7,581,308 | B2 | 9/2009 | Finn |
| 7,768,407 | B2 | 8/2010 | Forster |
| 8,020,283 | B2 | 9/2011 | Munn |
| 2004/0026754 | A1* | 2/2004 | Liu et al. .................. 257/414 |
| 2007/0090955 | A1* | 4/2007 | Cote et al. ............... 340/572.5 |
| 2008/0186185 | A1* | 8/2008 | Herrmann et al. ....... 340/572.7 |
| 2008/0283615 | A1* | 11/2008 | Finn ......................... 235/488 |
| 2011/0247197 | A1* | 10/2011 | Finn .......................... 29/600 |

FOREIGN PATENT DOCUMENTS

EP 1039543 A2 9/2000

* cited by examiner

*Primary Examiner* — Steven S Paik
*Assistant Examiner* — Asifa Habib
(74) *Attorney, Agent, or Firm* — Crawford Maunu PLLC

(57) ABSTRACT

RFID tag structures are disclosed. In one embodiment, the RFID tag includes a flexible substrate, a strap attached to the substrate, an RFID IC mounted on the strap, and an antenna. The strap has a first surface, a second surface, and first and second terminals exposed on the first surface. The second surface of the strap is attached to the substrate. The RFID IC is electrically coupled to the first and second terminals. The antenna is attached to the first surface of the flexible substrate and connected to the first and second terminals on the first surface of the strap.

27 Claims, 3 Drawing Sheets

RFID TAG ON FLEXIBLE SUBSTRATE ARRANGEMENT

FIELD OF THE INVENTION

The embodiments of the present invention generally relate to RFID tags.

BACKGROUND

Radio frequency identification (RFID) applications vary from inventory control to traffic management to pet identification. RFID systems generally include readers and tags. The RFID reader emits a signal to activate the RFID tag, and the RFID tag responds generally by reading data from a memory and emitting a signal with the desired information for the RFID reader.

There are a number of challenges facing makers of RFID tags. Some challenges arise from those applications in which RFID electronics are very small. Connecting RFID integrated circuits (ICs) to antennas can be challenging because of the small pads on the RFID IC. Straps/interposers have been used to address this problem. The straps have larger pads than pads on the RFID IC for connecting the RFID IC to the antenna. The larger pads of the strap make it easier to align and connect to leads of the antenna.

Other challenges arise from the substrates used for RFID tags. Making an RFID tag using a polyamide or polyimide substrate may be prohibitively expensive for some applications calling for a flexible substrate. The expense is attributable to the substrate material and the print-and-etch processes used in creating the wiring pattern. Expensive chemicals are required for print-and-etch processes, and hazardous waste is a byproduct.

A structure and method that address these and other related issues are therefore desirable.

SUMMARY

The various embodiments of the invention provide an RFID tag. The RFID tag includes a flexible substrate, a strap attached to the substrate, an RFID IC mounted on the strap, and an antenna. The strap has a first surface, a second surface, and first and second terminals exposed on the first surface. The second surface of the strap is attached to the substrate. The RFID IC is electrically coupled to the first and second terminals. The antenna is attached to the first surface of the flexible substrate and connected to the first and second terminals on the first surface of the strap.

In another embodiment, a method of making an RFID tag is provided. The method includes attaching an RFID integrated circuit (IC) to a strap and electrically connecting terminals of the RFID IC to pads on the strap. The strap has a first surface, a second surface, and first and second terminals exposed on the first surface. The pads on the strap are electrically coupled to the first and second terminals. The strap is attached to a flexible substrate with the second surface of the strap in contact with the substrate. Antenna wiring is attached to the flexible substrate after attaching the strap to the substrate. The antenna wiring is attached to the terminals on the strap after attaching the strap to the substrate.

The above summary of the present invention is not intended to describe each disclosed embodiment of the present invention. The figures and detailed description that follow provide additional example embodiments and aspects of the present invention.

BRIEF DESCRIPTION OF THE DRAWINGS

Other aspects and advantages of the invention will become apparent upon review of the Detailed Description and upon reference to the drawings in which.

DETAILED DESCRIPTION

The embodiments of the invention simplify attachment of antenna wiring to the RFID IC in an RFID tag. In addition, the RFID tag may be constructed with low-cost materials and processes, and the RFID tag requires fewer environmentally hazardous chemicals for its manufacture.

In one embodiment, attachment of antenna wiring to the RFID IC in an RFID tag is simplified over prior approaches and devices. Prior approaches form antenna wiring on the substrate and then use straps with large pads for connecting to the antenna wiring. However, aligning the pads of the strap with the antenna leads could be challenging because the pad-side of the strap is placed over the leads for making the connection. Thus, prior approaches entail blind placement of the strap over the antenna leads, which may require costly equipment and processes and result in an increased chance of misalignment and faulty connections.

The embodiments of the present invention include a strap that is attached to a flexible substrate. An RFID IC is mounted on the strap and is electrically coupled to terminals on the strap. The terminals are on a surface of the strap that faces away from the substrate. Thus, the terminals are exposed for connecting to the antenna wiring. The antenna is attached to the exposed terminals on the strap and also attached to the surface of the substrate.

Figure 1:
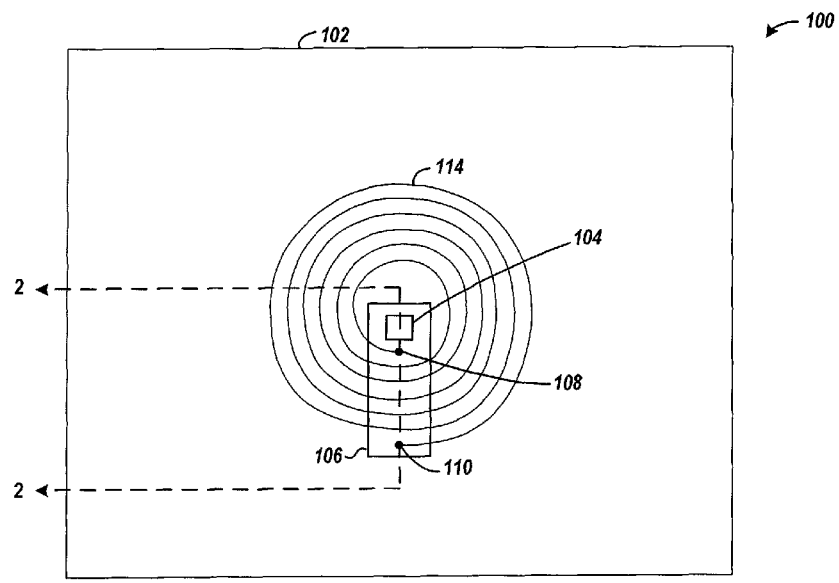
FIG. 1 is a top view of an RFID tag in accordance with one or more embodiments of the invention.

FIG. 1 is a top view of an RFID tag 100 in accordance with one or more embodiments of the invention. The RFID tag includes a flexible substrate 102, an RFID IC 104, a strap 106, terminals 108 and 110 on the strap, and coil antenna wire 114. Strap 106 has terminals 108 and 110. The particular functions of the RFID IC are application dependent. However, in general the IC modulates and demodulates an RF signal and processes information according to the application.

The RFID IC 104 is attached and electrically connected to bond pads (not shown) on the strap 106, and the RFID IC is electrically coupled to the terminals 108 and 110 on the strap by metal traces (not shown) on the strap. The RFID IC may be packaged or unpackaged according to application requirements. The strap 106 is attached to the substrate 102, and the terminals 108 and 110 are exposed for accommodating connections to the antenna 114. The terminals 108 and 110 of the strap 106 are connected to antenna wiring 114, which is laid over the exposed terminals and adhered to the substrate 102 with an adhesive, for example.

The combination of the RFID IC attached to the strap, the strap attached to the substrate with an adhesive, and antenna wiring laid over the exposed terminals of the strap provides substantial benefits in reducing production costs. Because the RFID IC and strap are not soldered to the substrate, a variety of inexpensive materials may be used for the substrate. The substrate is not limited to materials that can withstand high-temperature soldering. Because the strap with RFID IC is attached to the substrate and the terminals on the strap are exposed, the antenna wiring can be laid over the straps and permanently connected to the terminals. Rather than using expensive print-and-etch techniques to make antenna wiring for the RFID IC, strands of wire can be glued to the substrate and electrically attached to the strap. The wire may be attached to the strap with a conductive adhesive or with low temperature soldering. The wire may be bare or insulated wire and made of any material suitable for the application. It will be appreciated that wire as used herein does not refer to printed or printed-and-etched patterns of conductive material. Rather, as used herein, wire refers to one or more strands of conductive material that have been made, for example, by drawing the conductive material through draw plates. For some embodiments, only the strap needs to be a material that is suitable for soldering and connecting to the RFID IC, and the flexible substrate can be a material that is inexpensive. Instead of using polyamide or polyimide for the substrate, the substrate may be polyethylene terephthalate (PET), polyelectrolyte multilayers (PEMs), paper, or high-density polyethylene (e.g., TYVEK®), for example.

In one embodiment, the strap is made from polyamide or polyimide. Metal traces may be printed and etched to provide the bond pads for the RFID IC and the terminals for connecting the antenna wiring. In other embodiments, the strap may be made from various polyesters, polyethylene naphthalate (PEN), or vinyl, and metal traces may be formed accordingly.

The embodiments of the invention support reduced manufacturing costs. The process of connecting the antenna wiring to the RFID IC is simplified because the wiring is laid over the exposed terminals on the strap. Instead of having to blindly align terminals of the strap with wiring that had been previously laid out on the substrate, the wires are laid over and connected to the visible terminals on the strap.

In one embodiment, the antenna wiring 114 is a fine gauge bare wire. For example, 44 gauge (AWG) copper wire has been found to be suitable for some applications. However, different gauges may be suitable for different applications. The wire is glued to the surface of the substrate with a polymer adhesive. In one embodiment, the adhesive is pressure sensitive, which keeps the wire in place as the antenna pattern is formed on the substrate. For example, the adhesive may be an adhesive transfer tape such as VHB™ 9460PC transfer tape from 3M™ Company. It will be appreciated that other types of adhesives may be suitable for different applications.

Figure 2:
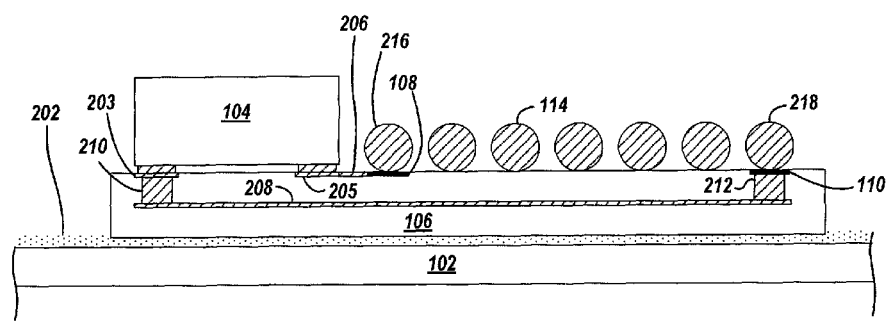
FIG. 2 is a cross-sectional view of a portion of the RFID tag of FIG. 1 taken in the direction of 2-2.

FIG. 2 is a cross-sectional view of a portion of the RFID tag of FIG. 1 taken in the direction of 2-2. For ease of illustration, the cross-sectional view is not in scale with the top view of FIG. 1.

The cross-sectional view shows RFID IC 104 attached to strap 106. The strap is attached to the substrate 102 with adhesive 202. The adhesive may be a pressure-sensitive adhesive or some other adhesive that is suitable for the intended application. The RFID IC 104 is attached to contact pads 203 and 205 on the strap by soldered connections, for example. Metal traces 206 and 208 on the strap lead from the contact pads 203 and 205 to terminals 108 and 110. In an example embodiment, the RFIC IC is connected to the metal trace 208 by way of conductive via 210, and the trace 208 is connected to the terminal 110 by way of conductive via 212. In one embodiment, the metal traces 206 and 208 are printed-and-etched on the strap 106. It will be appreciated that straps of different materials may call for different methods of forming the metal traces.

Being on the surface of the strap that faces away from the substrate, the terminals 108 and 110 are thereby exposed for connection to leads of the antenna. Terminal end 216 of the antenna wire 114 is electrically connected to terminal 108 on the strap, and terminal end 218 of the antenna wire is electrically connected to terminal 110 on the strap. In one embodiment, the wire is soldered to the terminals, and in another embodiment the wire is attached to the terminals with a conductive adhesive.

Figure 3:
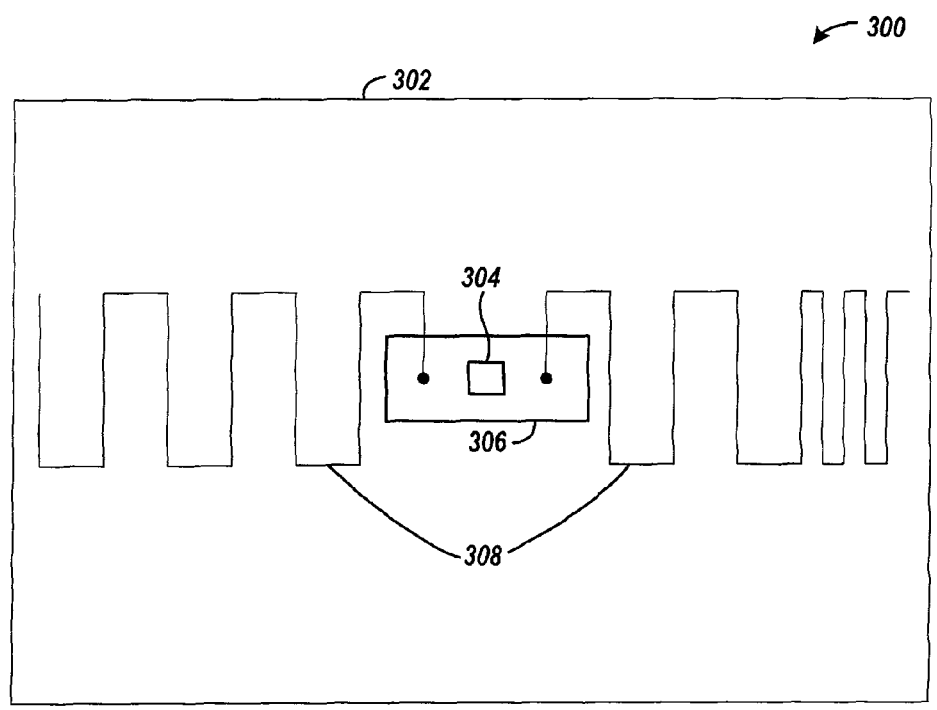
FIG. 3 is a top view of an RFID tag in accordance with one or more embodiments of the invention.

FIG. 3 is a top view of an RFID tag 300 in accordance with one or more embodiments of the invention. RFID tag 300 has an alternative antenna pattern to that of RFID tag 100 of FIG. 1. The antenna 308 of RFID tag 300 is a meandering dipole antenna. Though only two antenna patterns are illustrated in the application (FIGS. 1 and 3), it will be appreciated that the disclosed structures are adaptable for any of the many different antenna patterns known in the art and suitable for RFID applications.

As with the RFID tag 100 of FIG. 1, RFID tag 300 includes a flexible substrate 302 and an RFID IC 304 mounted on a strap 306. In the RFID tag 300, the strap and antenna may be adhered to the substrate 302, and the RFID IC 304 may be attached to the strap as described for the RFID tag 100. The connections of the terminal ends of the antenna 308 to the strap 306 may also be as described for the RFID tag 100. The strap 306 may differ from the metal strap 106 of RFID tag 100 in that the terminals may be on opposite sides of the RFID IC.

Figure 4:
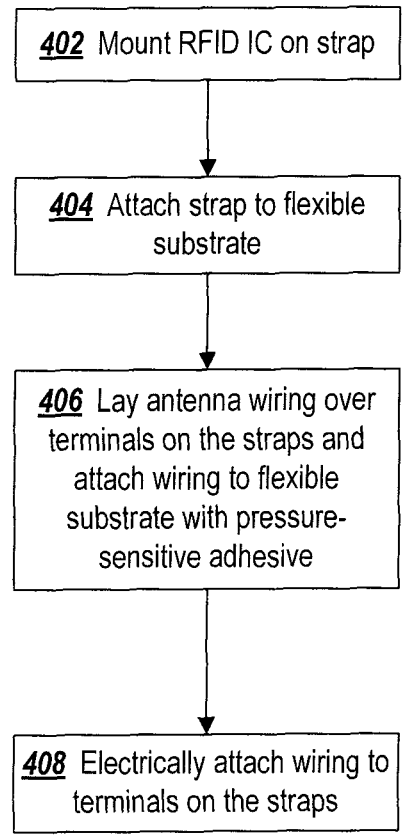
FIG. 4 is a flowchart of a process for making an RFID tag in accordance with one or more embodiments.

FIG. 4 is a flowchart of a process for making an RFID tag in accordance with one or more embodiments. At block 402, an RFID IC is mounted on a strap. In one embodiment, the RFID IC is soldered to contact pads on the strap. The strap is attached to the flexible substrate at block 404. Pressure-sensitive adhesive may be used to easily position and mount the strap at the desired location on the substrate. At block 406, antenna wiring is laid over the terminals on the strap. In one embodiment, the antenna wiring is attached to the flexible substrate with a pressure-sensitive adhesive. The antenna wiring is electrically attached to the terminals on the strap at block 408. The antenna wiring may be soldered to the terminals or attached with a conductive adhesive according to application requirements.

The present invention is thought to be applicable to a variety of RFID-based applications. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. An RFID tag, comprising:
a flexible substrate having a first surface;
a strap having a first surface, a second surface, and first and second terminals exposed on the first surface of the strap, the strap attached to the flexible substrate with the second surface of the strap attached to the first surface of the substrate;
an RFID integrated circuit (IC) mounted on the strap and electrically coupled to the first and second terminals;
an antenna attached to the first surface of the flexible substrate and attached at and electrically connected to the first and second terminals on the first surface of the strap.

2. The RFID tag of claim 1, wherein the antenna is adhered to the substrate with an adhesive.

3. The RFID tag of claim 2, wherein the adhesive is a pressure-sensitive adhesive.

4. The RFID tag of claim 1, wherein the strap is adhered to the substrate with an adhesive.

5. The RFID tag of claim 4, wherein the adhesive is a pressure-sensitive adhesive.

6. The RFID tag of claim 1, wherein the antenna is one of a coil antenna or a dipole antenna.

7. The RFID tag of claim 1, wherein the antenna comprises insulated copper wire.

8. The RFID tag of claim 1, wherein the antenna comprises bare copper wire.

9. The RFID tag of claim 1, wherein the strap is one of a polyamide or a polyimide.

10. The RFID tag of claim 1, wherein the flexible substrate is one of a polyethylene terephthalate (PET), a polyelectrolyte multilayers (PEMs), paper, a high-density polyethylene, or a vinyl.

11. A method of making an RFID tag, comprising:
attaching an RFID integrated circuit (IC) to a strap and electrically connecting terminals of the RFID IC to pads on the strap, the strap having a first surface, a second surface, and first and second terminals exposed on the first surface, and the pads on the strap electrically coupled to the first and second terminals;
attaching the strap to a flexible substrate with the second surface of the strap in contact with the substrate;
attaching antenna wiring to the flexible substrate after attaching the strap to the substrate; and
attaching the antenna wiring at the first and second terminals exposed on the first surface of the strap after attaching the strap to the substrate.

12. The method of claim 11, wherein the attaching the strap to the substrate includes:
applying an adhesive to the substrate and securing the strap to the substrate with the adhesive.

13. The method of claim 12, wherein the adhesive is a pressure-sensitive adhesive.

14. The method of claim 11, wherein the attaching the antenna wiring to the substrate includes:
applying an adhesive to the substrate and securing the antenna wiring to the substrate with the adhesive.

15. The method of claim 14, wherein the adhesive is a pressure-sensitive adhesive.

16. The method of claim 11, wherein the attaching the antenna wiring to the terminals on the strap includes soldering terminal ends of the antenna wiring to the terminals on the strap.

17. The method of claim 11, wherein the attaching the antenna wiring to the terminals on the strap includes attaching terminal ends of the antenna wiring to the terminals on the strap with a conductive adhesive.

18. An RFID tag, comprising:
a flexible substrate having a first surface;
a strap having first and second opposing surfaces and first and second terminals on the first surface of the strap, the strap attached to the flexible substrate with the second surface of the strap facing the first surface of the substrate;
an RFID integrated circuit (IC) mounted on the strap and electrically coupled to the first and second terminals;
an antenna attached to the first surface of the flexible substrate and attached at and electrically connected to the first and second terminals on the first surface of the strap.

19. The RFID tag of claim 18, wherein the antenna is adhered to the substrate with an adhesive.

20. The RFID tag of claim 19, wherein the adhesive is a pressure-sensitive adhesive.

21. The RFID tag of claim 18, wherein the strap is adhered to the substrate with an adhesive.

22. The RFID tag of claim 21, wherein the adhesive is a pressure-sensitive adhesive.

23. The RFID tag of claim 18, wherein the antenna is one of a coil antenna or a dipole antenna.

24. The RFID tag of claim 18, wherein the antenna comprises insulated copper wire.

25. The RFID tag of claim 18, wherein the antenna comprises bare copper wire.

26. The RFID tag of claim 18, wherein the strap is one of a polyamide or a polyimide.

27. The RFID tag of claim 18, wherein the flexible substrate is one of a polyethylene terephthalate (PET), a polyelectrolyte multilayers (PEMs), paper, a high-density polyethylene, or a vinyl.

* * * * *